US007953816B2

(12) United States Patent
Deen et al.

(10) Patent No.: US 7,953,816 B2
(45) Date of Patent: May 31, 2011

(54) VIRTUAL MEMORY TECHNIQUE FOR EFFICIENTLY SOLVING CONNECTED PROBLEMS IN A DISTRIBUTED ENVIRONMENT

(75) Inventors: Robert G. Deen, San Jose, CA (US);
James H. Kaufman, San Jose, CA (US);
Tobin J. Lehman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1293 days.

(21) Appl. No.: 11/328,829

(22) Filed: Jan. 10, 2006

(65) Prior Publication Data
US 2007/0162603 A1    Jul. 12, 2007

(51) Int. Cl.
*G06F 15/167* (2006.01)
*G06F 15/16* (2006.01)

(52) U.S. Cl. ........ 709/213; 709/202; 709/215; 709/214; 709/216

(58) Field of Classification Search .................. 709/214, 709/216, 213, 215, 202; 710/300; 711/1, 711/147; 718/100, 105; 714/1, 796
See application file for complete search history.

(56) References Cited

U.S. PATENT DOCUMENTS

| 4,920,487 | A * | 4/1990 | Baffes ........................... 718/105 |
| 6,295,608 | B1 * | 9/2001 | Parkes et al. ...................... 714/1 |
| 2003/0069939 | A1 * | 4/2003 | Russell ......................... 709/214 |
| 2004/0243915 | A1 * | 12/2004 | Doyle et al. .................. 714/796 |
| 2004/0244006 | A1 | 12/2004 | Kaufman et al. |
| 2005/0015571 | A1 | 1/2005 | Kaufman et al. |

OTHER PUBLICATIONS

Deen et al., U.S. Appl. No. 11/329,263, Office Action Communication, Sep. 16, 2010, 10 pages.
Webster's Third New International Dictionary of the English Language (Philip Gove ed,. 1967), pp. 1977-1978.
Deen et al., "The Almaden OptimalGrid Project", Fifth Annual International Workshop, 2003 IEEE.
Lehman et al., "OptimalGrid: Middleware for Automatic Deployment of Distributed FEM Problems on an Interent-Based Computing Grid", 2003 IEEE.

* cited by examiner

*Primary Examiner* — Nathan Flynn
*Assistant Examiner* — Stephanie Chang
(74) *Attorney, Agent, or Firm* — Gibb I.P. Law Firm, LLC (57) ABSTRACT

Embodiments herein present a virtual memory technique for efficiently solving connected problems in a distributed environment. An exemplary method begins by selectively loading computing task segments into a first node, wherein the number of computing task segments is the maximum number of computing task segments that will fit within the first node. The computing task segments are enclosed within wrappers, wherein the wrappers are streamed into the first node at a maximum rate that a disk can read and write data. Further, the wrappers comprise priority wrappers that must be computed in order to process the computing task segments; and thus, the priority wrappers are loaded into the first node first. In addition, the computing task segments comprise computing task segment block collections, wherein the method creates a list of computing task segment block collection jobs that must be completed in order to process one of the computing task segments.

15 Claims, 9 Drawing Sheets

VIRTUAL MEMORY TECHNIQUE FOR EFFICIENTLY SOLVING CONNECTED PROBLEMS IN A DISTRIBUTED ENVIRONMENT

CROSS-REFERENCE TO RELATED APPLICATION

The present application is related to a new U.S. patent application, filed concurrently, to Tobin J. Lehman, Robert Glenn Deen and James Kaufman, entitled "An Efficient Super Cluster Implementation For Solving Connected Problems In A Distributed Environment", having (IBM), assigned to the present assignee, and incorporated herein by reference.

BACKGROUND OF THE INVENTION

1. Field of the Invention

Embodiments herein present a virtual memory technique for efficiently solving connected problems in a distributed environment.

2. Description of the Related Art

There is a class of connected problems that involve problem sizes that span a single machine—common examples are Finite Element Model problems that involve simulating large physical systems. When dividing a problem across multiple machines in order to speed up the overall elapsed computation time, a common technique is to use a set of machines with enough memory that the distributed problem pieces all fit in real memory on their respective machines. When there are not enough machines with enough memory to contain the problem, then some other solution must be used. Presently, the prior art lacks a method for managing the problem pieces when they do not fit in the available memory. Moreover, the prior art presently lacks a method for building an efficient virtual memory mechanism for this grid environment that will work in a general-purpose way for any parallel problem.

Currently, there are no general-purpose solutions to this problem, other than the use of general-purpose Operating System virtual memory. Any application-specific solution is not useful as a general resource for solving parallel problems. Further, any proposed problem is application-specific, or too inefficient.

As large compute jobs become more plentiful, there will be a business in selling compute cycles and compute systems (grids, clusters) to businesses with large applications to run. In some cases, the pool of compute resources will be adequate (there will be one compute node for each compute problem "piece"). However, in other cases there will not be enough compute resources to go around. There must be a way to run these jobs, albeit at a somewhat slower pace, that does not rely on ad hoc solutions or inefficient general-purpose operating support for virtual memory.

SUMMARY OF THE INVENTION

When solving large connected problems (such as Finite Element Model problems) that are distributed across multiple computers, one generally is able to employ enough compute resources to solve the problem. For example, if one has an application that requires one terabyte of main memory storage in order to solve it, then one would expect to have at least 1000 one-gigabyte computers, or 200 five-gigabyte computers, or 100 ten-gigabyte computers, or 50 twenty-gigabyte computers, etc. However, when adequate compute resources are not available, one typically waits until they are available. The only real alternative—using compute nodes with less than sufficient physical memory—is not attractive if it requires using Operating System virtual memory. The non-clustered nature of this type of problem would result in a fairly random access pattern that would thrash the disk drive and slow down the problem computation to a crawl. Although an application-specific solution could be used, this would not qualify as a general-purpose solution. What is needed is a general purpose mechanism that is able to manage the memory efficiently for any parallel problem.

Exemplary embodiments of the invention use the natural problem partitioning of the OptimalGrid system. Since OptimalGrid partitions a parallel problem into pieces much smaller than the amount that would be distributed to a compute node, it provides a natural set of boundaries that can be used to form pieces that fit in memory. Furthermore, these pieces can be moved into memory in an intelligent fashion, thus providing a fast and efficient virtual memory mechanism for these problem pieces.

The advantages of this method are several. First, it is a general-purpose solution for managing memory when there is more application data than there is physical memory. Second, it is much faster than the alternative of using Operating System virtual memory. Third, it works in concert with other OptimalGrid inventions to further increase compute efficiency and decrease overall problem execution time.

Embodiments herein present a virtual memory technique for efficiently solving connected problems in a distributed environment. One exemplary method of embodiments of the invention begins by selectively loading computing task segments into a first node, wherein the number of computing task segments is the maximum number of computing task segments that will fit within the first node. The computing task segments are enclosed within wrappers, wherein the wrappers are streamed into the first node at disk transfer rate speeds (the maximum rate one can read or write data). Further, the wrappers comprise priority wrappers that must be computed in order to process the computing task segments; and thus, the priority wrappers are loaded into the first node first. In addition, the computing task segments comprise computing task segment block collections, wherein the method creates a list of computing task segment block collection jobs that must be completed in order to process one of the computing task segments.

The method further comprises unloading wrappers and/or computing task segment block collections from an unavailable computing node and loading and processing the wrappers and/or computing task segment block collections through an available computing node. Additionally, the method unloads portions of the wrappers from the local off-central-processor storage and loads the portions of the wrappers onto computing memory of the computing nodes. Following this, the computing task segments on the first node are processed to produce computing task segment iteration results, wherein the computing task segment iteration results are subsequently communicated to other computing nodes.

Embodiments of the invention further comprise a method for handling a computing task when a computing task segment is too large for a single computing node. The method divides the computing task segment into a plurality of computing task segment block collections and computing task segment block edges. It is contemplated that the computing task segment block collections and the computing task segment block edges can be enclosed within a covering. Specifically, the covering could comprise multiple layers of computing task segment blocks or a wrapper of computing task segment block collections.

After the computing task segment is divided, the computing task segment block edges and at least one of the computing task segment block collections are loaded onto the computing node. When there is a lack of computing memory to hold all of the computing task segment block edges within the computing node, the computing task segment block edges are further divided into computing task segment block edge portions. Subsequently, the computing task segment block edge portions are selectively loaded onto the computing node.

Following this, the computing task segment block collection(s) are processed within the computing node at disk transfer rate speeds. The method then unloads the processed computing task segment block collection(s) from the computing node and loads additional computing task segment block collection(s) onto the computing node.

Accordingly, embodiments herein relate to managing variable program partitions, or VPPs (i.e., the computing task segments), which are collections of original problem cells, or OPCs (i.e., the computing task segment block collections)—essentially the unit cells of a distributed computing job. OPCs on the edges of a VPP serve as intercommunication nodes to buffer data being sent back/forth to/from other VPPs. Entire edges can be swapped between VPPs to transfer information needed by different VPPs. The set of edges is referred to as an OPC Collection Wrapper, or an OCW (i.e., the wrapper or covering). The problem is that a particular computing node has only so much local memory, so it can process only a certain number of VPPs at a time, perhaps even not an entire VPP at once, without using a lot of local off-cpu storage (which is slow). The solution is to load as many VPPs as possible into local memory for fast processing, with priority given to OCWs that can be streamed in and processed first so the results of a VPP iteration are available for communication with other nodes. If one computing node is free, it can load and process OCWs for another computing node to speed up overall processing.

These and other aspects of the embodiments of the invention will be better appreciated and understood when-considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Embodiments herein relate to managing VPPs (i.e., the computing task segments), which are collections of OPCs (i.e., the computing task segment block collections)—essentially the unit cells of a distributed computing job. OPCs on the edges of a VPP serve as intercommunication nodes to buffer data being sent back/forth to/from other VPPs. Entire edges can be swapped between VPPs to transfer information needed by different VPPs. The set of edges is referred to as an OCW (i.e., the wrapper or covering). The problem is that a particular computing node has only so much local memory, so it can process only a certain number of VPPs at a time, perhaps even not an entire VPP at once, without using a lot of local off-cpu storage (which is slow). The solution is to load as many VPPs as possible into local memory for fast processing, with priority given to OCWs that can be streamed in and processed first so the results of a VPP iteration are available for communication with other nodes. If one computing node is free, it can load and process OCWs for another computing node to speed up overall processing.

Embodiments of the invention apply to applications that are so large they must be divided and run on multiple (distributed) computers. Furthermore, the problems in these applications are connected, meaning that the solving of the problem will require communication between the machines holding the distributed problem to share the state of the individual problem pieces.

OptimalGrid is a grid middleware package available from International Business Machines Corporation, located in Armonk, N.Y., USA, that was designed to solve this class of problems. It manages the distribution of the problem pieces and the communication of the problem piece state between the computers working on the problem. As such, the OptimalGrid system is referred to in the detailed description of embodiments of the invention as an exemplary middleware package for solving connected problems in a distributed environment.

When there are not sufficient compute resources to process a distributed problem (i.e., there are not enough computers with enough physical memory to hold the entire distributed problem in physical memory), a general-purpose solution to using memory more efficiently than the general-purpose Operating System Virtual Memory scheme must be found.

Embodiments of the invention describe methods to create general-purpose virtual memory solutions for the general case of parallel problems. OptimalGrid's natural problem partitioning capability is employed to divide the problem into useable sections automatically. For the case when there is insufficient aggregate memory in the set of available machines, one of three techniques are employed to manage the distributed memory used in solving the problem. In order to describe the OptimalGrid system, its partitioning capability and its terminology, a simple parallel application based on a cellular automoton is used as an example.

Embodiments herein pertain to the mechanism by which the storage of the VPPs and the communication between VPPs are managed. To illustrate this, the detailed description of embodiments of the invention uses a simple variable size problem as an example—The Game of Life, available from Mathworld at http://mathworld.wolfram.com/Life.html, which is a form of cellular automaton.

Figure 1:
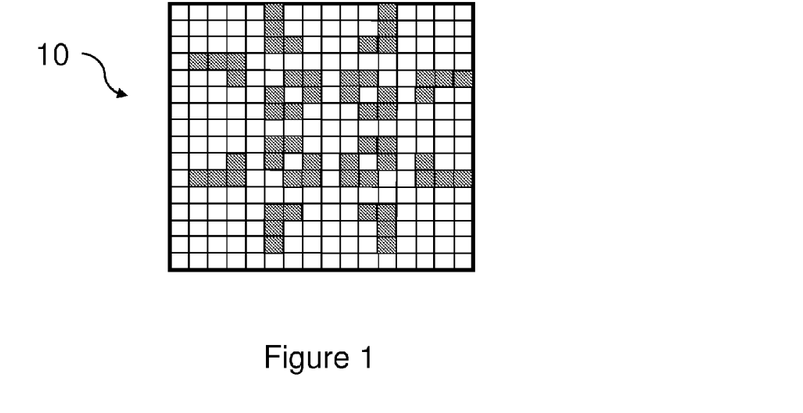
FIG. 1 illustrates a grid of filled and un-filled cells.

As illustrated in FIG. 1, the life cellular automaton is run by placing a number of filled cells on a two-dimensional grid 10. Each generation then switches cells on or off depending on the state of the cells that surround it. The rules are defined as follows. All eight of the cells surrounding the current one are checked to see if they are on or not. Any cells that are on are counted, and this count is then used to determine what will happen to the current cell: (1) Death: if the count is less than two or greater than three, the current cell is switched off; (2) Survival: if the count is exactly two, or the count is exactly three, and the current cell is on, the current cell is left unchanged; and (3) Birth: if the current cell is off and the count is exactly three, the current cell is switched on.

When a single computer application grows in size to the point where it can no longer be held on a single computer, then one way to run the application is to break up the problem into pieces, where the individual pieces reside on separate computers and the computers communicate with each other to pass along the application information from the edges—the internal boundaries of the data structure.

Figure 2A:
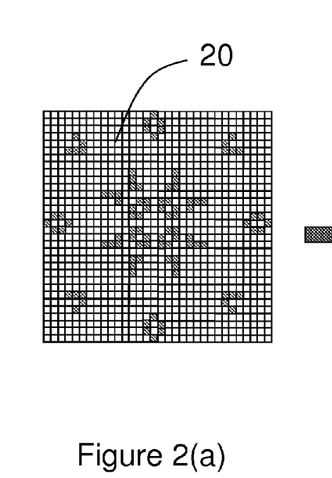
FIG. 2(a) illustrates a computing task.
Figure 2B:
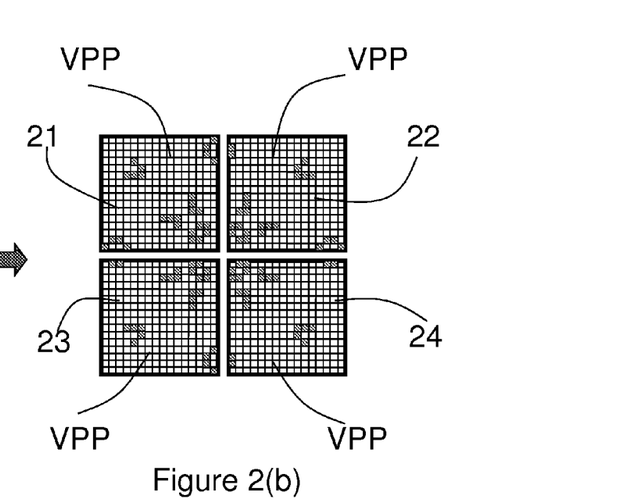
FIG. 2(b) illustrates computing task segments.

In FIGS. 2(a) and 2(b), a larger grid 20 (i.e., the overall computer problem) is illustrated which is too large for one machine. Thus, the problem is split into four equal size segments 21, 22, 23 and 24—the variable program partitions (VPPs), where each VPP will be run on a separate computer.

Figure 3:
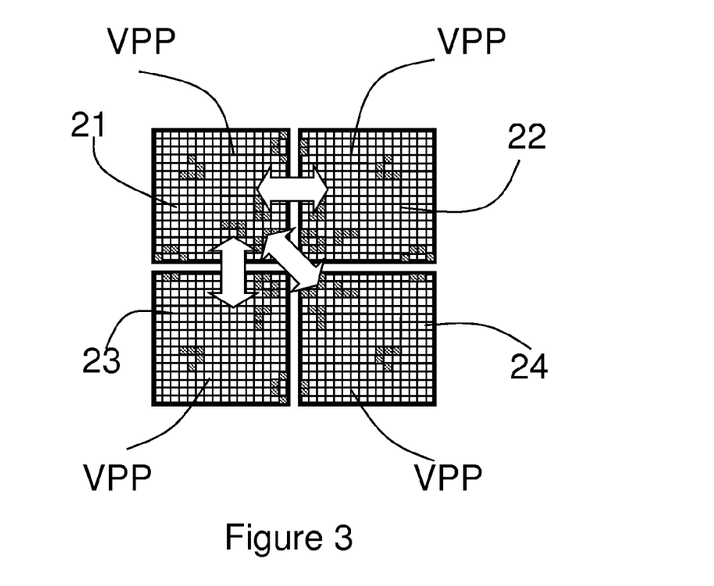
FIG. 3 illustrates communication between computing task segments.

When the problem is divided across computers, the state of the problem on one computer must be transmitted to its neighboring computer (FIG. 3). This is not a significant problem however, as only the edges of each VPP need to be transmitted to its neighboring computer, not the entire VPP.

Figure 4:
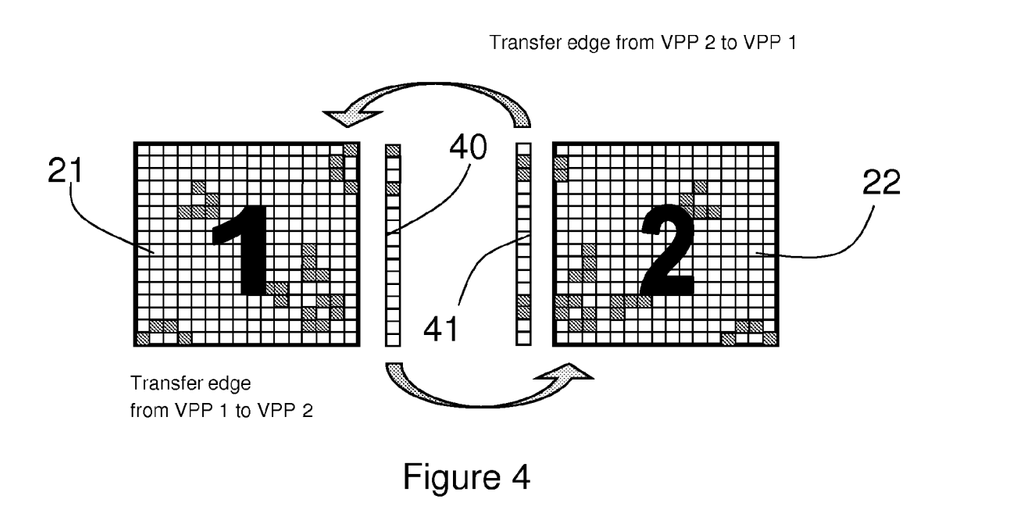
FIG. 4 illustrates a single layer edge swap between computing task segments.

FIG. 4 shows a single layer edge swap between edges 40 and 41. For each internal boundary, the place where the problem data structure is split across machines, the OptimalGrid middleware manages the transfer of the edges. This allows the application software (the Game of Life software, in this example) to be completely unaware of the OptimalGrid mechanism that is managing the inter-machine communication. The application software is only aware of its own data structures (provided by OptimalGrid) that contain the cell state and the pointers to the neighbor cells.

Figure 5:
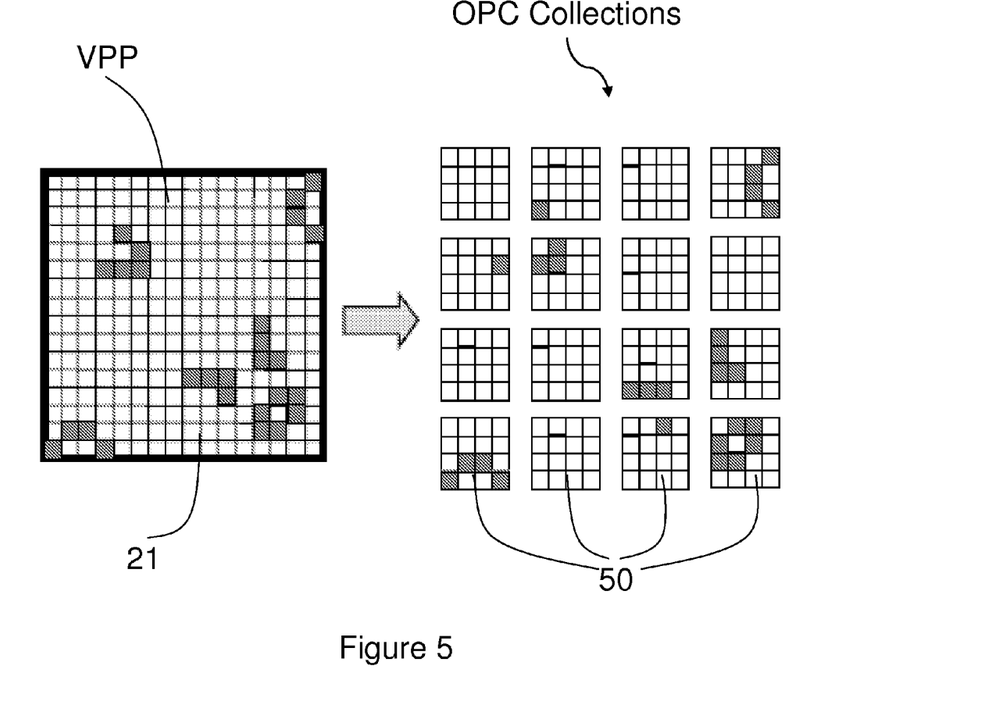
FIG. 5 illustrates a computing task segment comprising collections of computing task segment blocks.

There is actually more structure to a VPP than what is shown in FIGS. 2(b)-4. When OptimalGrid partitions a problem into pieces, it creates smaller structures, known as original program cell collections (also referred to herein as "OPC Collections"). In a two-dimensional example, such as the Game of Life, the OPC Collections look like tiles in the VPP. FIG. 5 shows how the structure of a VPP might look like, when the boundaries of the OPC Collections 50 are made more visible (again, this is for example purposes—a real life example would have OPC Collections with far more OPCs in them than the sixteen used here).

Figure 6:
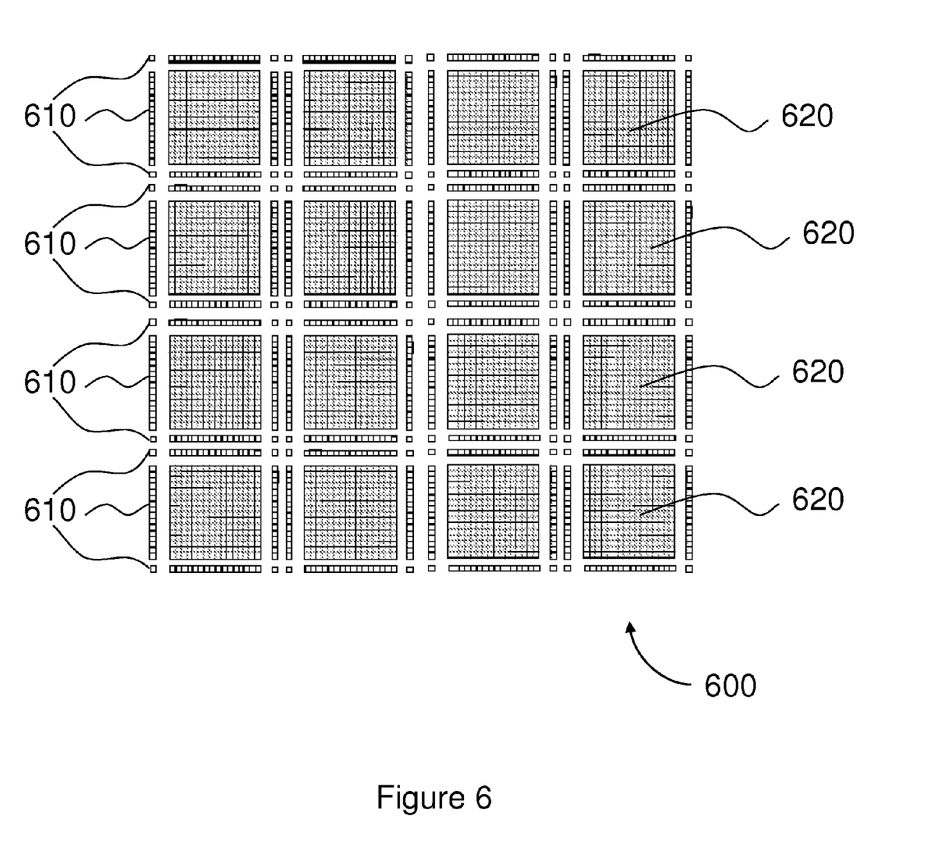
FIG. 6 illustrates a computing task segment comprising collections of computing task segment blocks and edges.

When a VPP is delivered to a compute node—if the VPP is too large for the amount of memory—embodiments of the invention present several options. First, if there is enough room to hold all edges of OPC Collections in memory and at least one OPC Collection, then the VPP can be sparsely filled in in-memory, and the OPC Collections can be streamed in from disk as they are processed. This allows the OPC Collections to be at least processed at disk transfer rate speeds (the maximum rate that a disk can read and write data), which is much greater than disk random access speeds. Continuing with the simple two-dimensional Cartesian example (the same model as the Game of Life example), FIG. 6 shows a complete VPP 600 held in memory, with all edges 610 and OPC Collections 620 represented.

Figure 7:
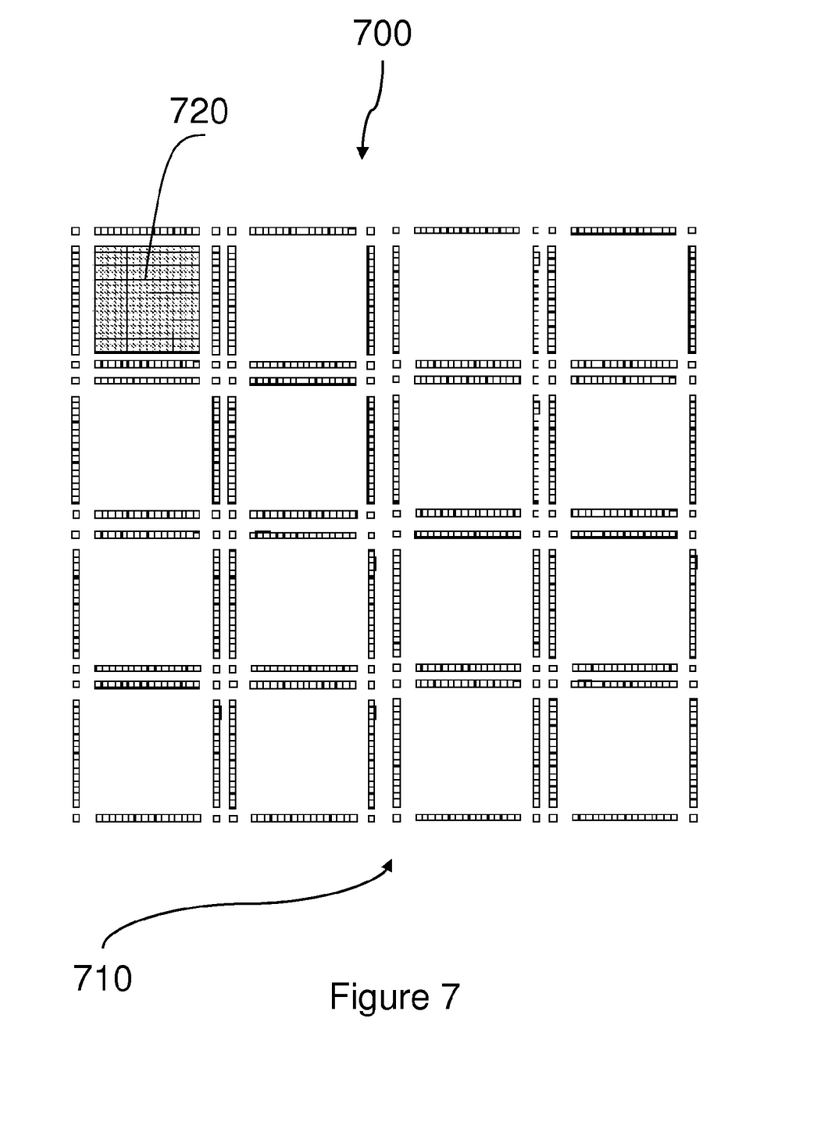
FIG. 7 illustrates a computing task segment comprising one collection of computing task segment blocks and edges.

FIG. 7 shows a sparse VPP 700, with all edges 710 present, but only one OPC Collection 720 at a time is brought in for processing. When there is not enough memory to hold even one OPC Collection 720 with all of the edges 710, then this scheme can be further decomposed into subsets of the edges 710 that can fit into memory. For example, the sparse VPP 700 image shown in FIG. 7 could be divided into halves, thirds, quarters, etc.

Figure 8:
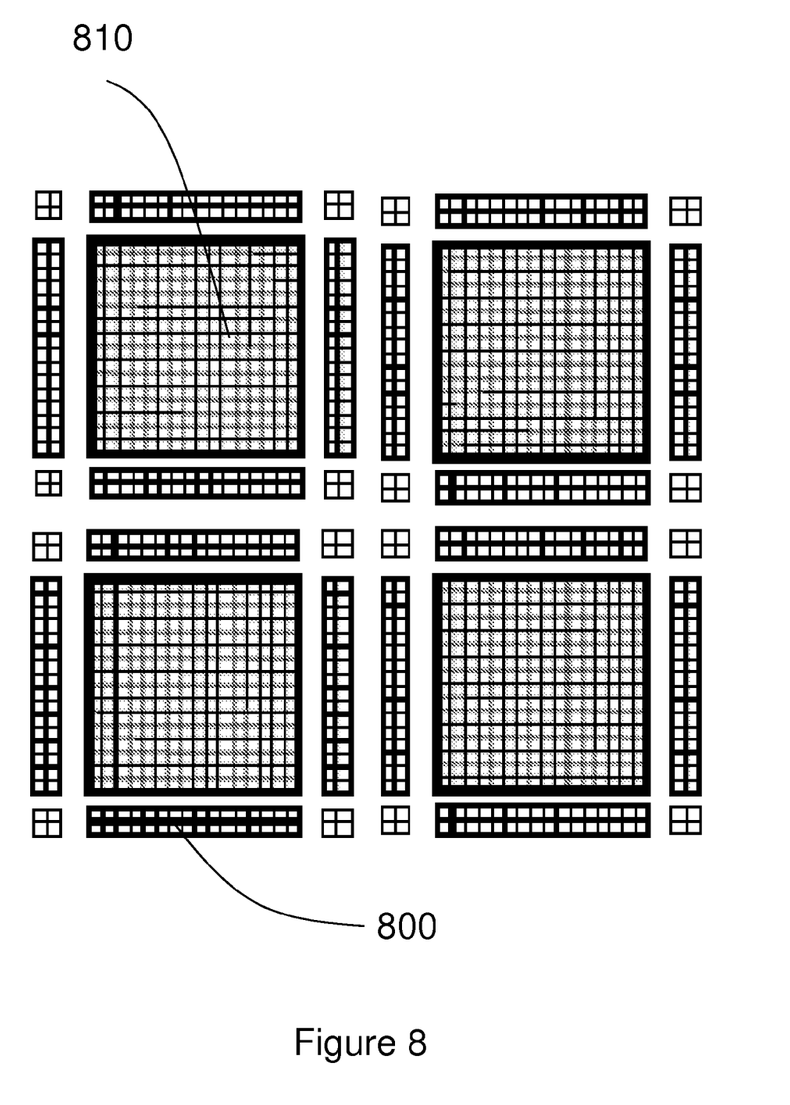
FIG. 8 illustrates collections of computing task segment blocks surrounded by multi-layer edges.
Figure 9:
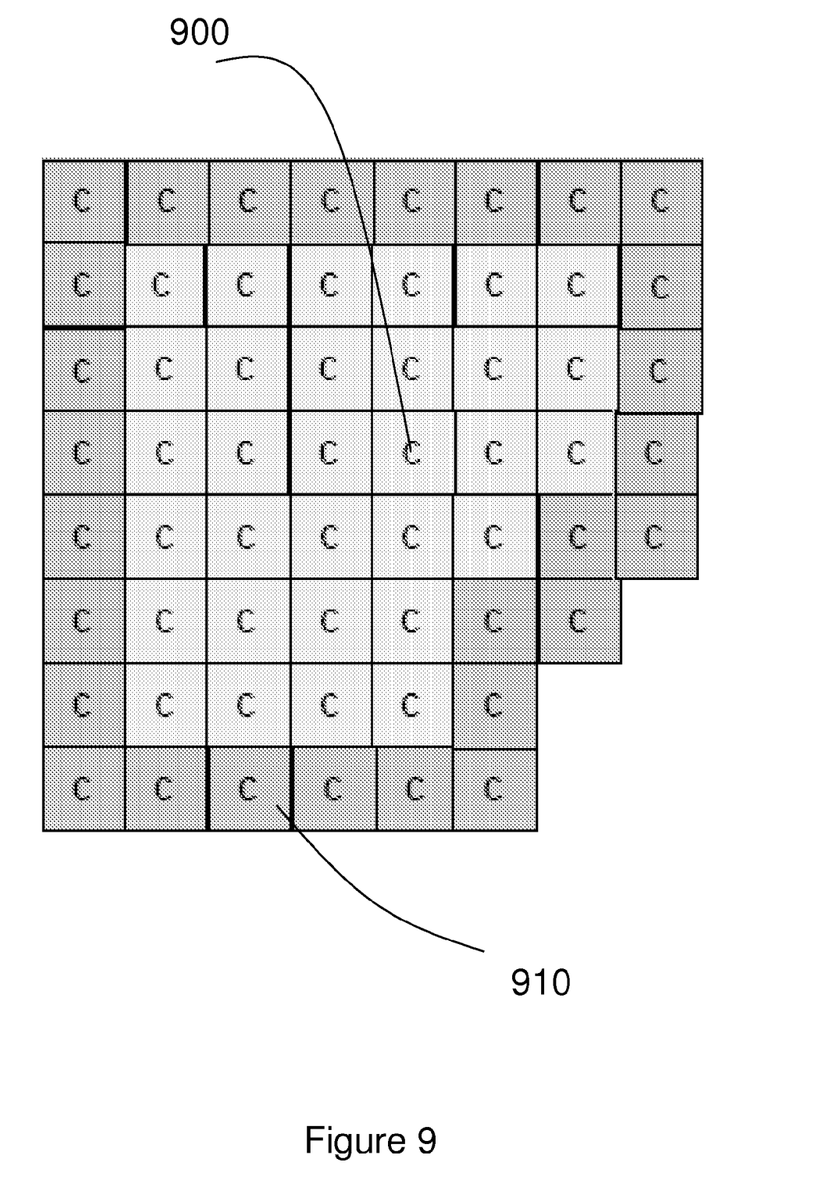
FIG. 9 illustrates a wrapped computing task segment.

The second option presented by embodiments of the invention, uses this technique in conjunction with the SuperCluster technique—either the standard multi-layer edge technique, as shown in FIG. 8, or the OptimalGrid SuperCluster technique, as shown in FIG. 9. The standard multi-layer edge technique uses multi-layer edges 800 to surround OPC Collections 810. The OptimalGrid SuperCluster technique wraps some number of OPC Collections 900 with a full layer of OPC Collections 910. The OptimalGrid SuperCluster wrapper has the attribute of being able to compute a number of iterations of the problem, rather than the usual case of being able to compute only one iteration before OptimalGrid communicates the VPP (or OPC Collection) edge values with the computers holding the neighboring problem pieces.

The third option for handling a VPP that is too large for the amount of memory is the interruptible Grid Processor technique. Specifically, the interruptible Grid Processor technique can improve processing of a single compute node and its list of VPPs or VPP subsets. When a compute node has a list of OPC Collections to compute in a VPP that is too large for the compute node to hold them all in memory, it implicitly creates a list of "OPC Collection jobs" that it must compute in order for it to finish the entire VPP. In the event that one compute node finishes its jobs before the others, the faster (or early finishing) compute nodes can take jobs off of any compute node's input job queue and process it—putting the result back in the system by using the Community Message Bus.

The Grid Node Virtual Memory technique can employ many different mechanisms for solving problems. Embodiments of the invention have the ability to take a general-purpose parallel problem, described in the OptimalGrid object model, and then apply these virtual memory techniques through the exploitation of the internal OPC, OPC Collection and VPP structures that OptimalGrid uses. The use of the OPC Collections as virtual memory paging structures (with potentially some additional structure to manage the inter-OPC Collection communication) provides not only an approach for memory management, but a foundation in which many other techniques can be uses as well.

Embodiments of the invention utilize an automatic program manager (APM), a white board communication system, original problem cells (OPCs), variable problem partitions (VPPs), OPC Collections, Compute Agents (CAs), a problem builder, and a ProblemReBuilder. More specifically, the APM plays the role of Grid Controller and Grid Monitor. The APM is a coordinator for a running application on a grid. It does not administer the grid hardware; it monitors and optimizes the running application and is responsible for autonomic functionality like dynamic load balancing (self optimizing) and failure recovery (self healing). It monitors performance of the running grid "program". The performance measurements are made by other sources (e.g., the CAs) and fed back to the APM via a communication system. The APM knows the relative order or priority of each VPP based on dependencies discovered by the problem builder (or the ProblemReBuilder) and encoded in the VPPs themselves. The APM uses performance data monitored continually or at each iteration to produce a forward-looking schedule of remaining work based on real experience. It can redistribute and reprioritize the VPPs themselves and the CA VPP assignments.

The Grid Nodes, the CAs, and the APM must communicate with each other. They must communicate to execute the program (for connected programs); they must communicate program data (input output); and, they must exchange control data, assignments, performance diagnostics. For this purpose, embodiments herein use a communication system that is also like a queryable in-memory grid database. This is based on the IBM Tspaces Whiteboard technology available from International Business Machines Corporation, located in Armonk, N.Y., USA. The use of a whiteboard allows data sources and data synchs to exchange messages that are addressable, queryable by field, broadcastable (addressed to "all"), and registerable for callbacks or message events and message availability. Distributed whiteboard architecture is used to allow the system to scale to arbitrarily large grid size. The communication mechanism provides the required Feedback for a self-managing virtual grid processor.

The OPCs are analogous to a Byte of data in a traditional computer. It is, by definition, an object representing the smallest executable unit of data or code. An Object Model is used. An abstract OPC contains data, method(s), and pointers to neighbors. The data might be a byte of user data. The methods represent executable code. The pointers to neighbors indicate the relative location of other OPCs (local or remote) and can be null for an isolated independently calculable OPC. If the pointers to neighbors are not null the problem is connected and the OPCs must exchange data with other OPCs to do work. Hence, the entire application may be described as a graph.

A VPP is like a page and like a separate program thread. Each VPP contains many OPCs. A VPP is a unit of work assignable to a CA or Grid Node. The VPPs "know" about dependencies with other VPPs or other threads (running or otherwise). One or more VPPs are assigned to the CAs. The VPPs are pieces of the entire grid "program". The problem builder creates the pieces at program load time. Pieces may be redefined at run time by the ProblemReBuilder.

The OPC Collections are analogous to "segments". This (optional construct) are used in embodiments herein. The OPC Collections are objects intermediate in size between a tiny OPC and a large VPP. An OPC Collection contains one or more of the OPCs. A VPP is made of one or more of the OPC Collections. During load balancing, the VPPs assigned to the CAs may be resized on the fly by exchanging or moving the OPC Collections between the VPPs. The OPC Collections "know" about dependencies with other OPC Collections (running or otherwise). Because the OPC Collections are defined at program load time by the problem builder, dependencies between problem pieces need not be redefined or remapped at the individual OPC level when load balancing. Embodiments herein simply update which of the VPPs contain which of the OPC Collections.

The CAs are nodes or processors on the grid. They may also be virtual machines. CAs are like Processors that run parallel threads with known dependencies (the VPPs are like the thread and know their dependencies on other threads). The CAs are like processes but are also like local schedulers. The CAs are given (by the APM) assignments or schedules of work to do. This is a Hashtable or Map with a list of the VPPs to run (set of the OPC Collections) and an address list of where to find each of them. The VPPs assigned to a CA may be stored locally in memory, on disk, or in a remote datasource like TSpaces or a database. The CAs also have lists of where to find the VPPs that the VPPs assigned to them are connected too (where to find known dependencies). Each of the CAs have local intelligence and take recommendations or assignment schedules from the APM. Based on real results during execution, the CAs can: opportunistically take on more work; notify the APM (and/or neighbors) there is a problem; and, if they are too busy, they can put work up for bid or ask for help. Each CA has a list of the VPPs that enable batch scheduling. APM+batch scheduler allows predictive scheduling and real time loadbalancing. This enables continuous load balancing (no need to wait for end of sequence). This applies to independent or to dependent VPPs.

The problem builder is like the grid compiler. The problem builder divides the application into threads or VPPs at program load time. The VPPs are collections of OPCs that may be organized into groups or OPC Collections.

The ProblemReBuilder is like a real time reoptimizing compiler. This optional component can be used to resize the VPPs on the fly at run time. The VPPs are stored on the whiteboard as groups of OPC Collections. Individual OPC Collections may be simply reassigned from one VPP to another.

Embodiments herein present a virtual memory technique for efficiently solving connected problems in a distributed environment. One exemplary method of embodiments of the invention begins by selectively loading computing task segments (i.e., the VPPs) into a first node, wherein the number of computing task segments is the maximum number of computing task segments that will fit within the first node. As discussed above, the computing task segments "know" about dependencies with other computing task segments or other threads (running or otherwise).

The computing task segments are enclosed within wrappers (i.e., the OCWs), wherein the wrappers are streamed into the first node at disk "transfer-rate" speeds, which is much faster than disk "random-access" speeds. As discussed above, the wrappers have the attribute of being able to compute a number of iterations of the problem, rather than the usual case of being able to compute only one iteration before Optimal-Grid communicates the computing task segment (or computing task segment block collections) edge values with the computers holding the neighboring problem pieces.

Further, the wrappers comprise priority wrappers that must be computed in order to process the computing task segments; and thus, the priority wrappers are loaded into the first node first. In addition, the computing task segments comprise computing task segment block collections (i.e., the OPC Collections), wherein the method creates a list of computing task segment block collection jobs that must be completed in order to process one of the computing task segments. As discussed above; because the computing task segment block collections and their borders are defined at program load time by the problem builder, dependencies between problem pieces need not be redefined or remapped at the individual OPC level when load balancing.

The method further comprises unloading wrapper(s) and/or computing task segment block collection(s) from an unavailable computing node and loading and processing the wrapper(s) and/or the computing task segment block collection(s) through an available computing node. Additionally, the method unloads portions of the wrappers from the local off-central-processor storage and loads the portions of the wrappers onto computing memory of the computing nodes. Following this, the computing task segments on the first node are processed to produce computing task segment iteration results, wherein the computing task segment iteration results are subsequently communicated to other computing nodes. Thus, as discussed above, embodiments herein have the ability to take a general-purpose parallel problem, described in the OptimalGrid object model, and then apply these virtual memory techniques through the exploitation of the internal OPC, OPC Collection and VPP structures that OptimalGrid uses.

Another exemplary method for handling a computing task when a computing task segment is too large for a single computing node begins by dividing a computing task segment into computing task segment block collections and computing task segment block edges. It is contemplated that the computing task segment block collections and the computing task segment block edges can be enclosed within a covering. Specifically, the covering could comprise multiple layers of computing task segment blocks or a wrapper of computing task segment block collections. As illustrated in FIGS. 8-9, for example, either a multi-layer edge 800 can be used to surround OPC Collections 810; or, some number of OPC Collections 900 can be wrapped with a full layer of OPC Collections 910.

After the computing task segment is divided, the computing task segment block edges and at least one of the computing task segment block collections are loaded onto the computing node. As illustrated in FIG. 7, a sparse VPP 700 is shown, with all edges 710 present, but only one OPC Collection 720 at a time is brought in for processing. When there is a lack of computing memory to hold all of the computing task segment block edges within the computing node, the computing task segment block edges are further divided into computing task segment block edge portions. Subsequently, the computing task segment block edge portions are selectively loaded onto the computing node.

Following this, the computing task segment block collection(s) are processed within the computing node at disk transfer rate speeds. The method then unloads the processed computing task segment block collection(s) from the computing node and loads additional computing task segment block collection(s) onto the computing node.

Figure 10:
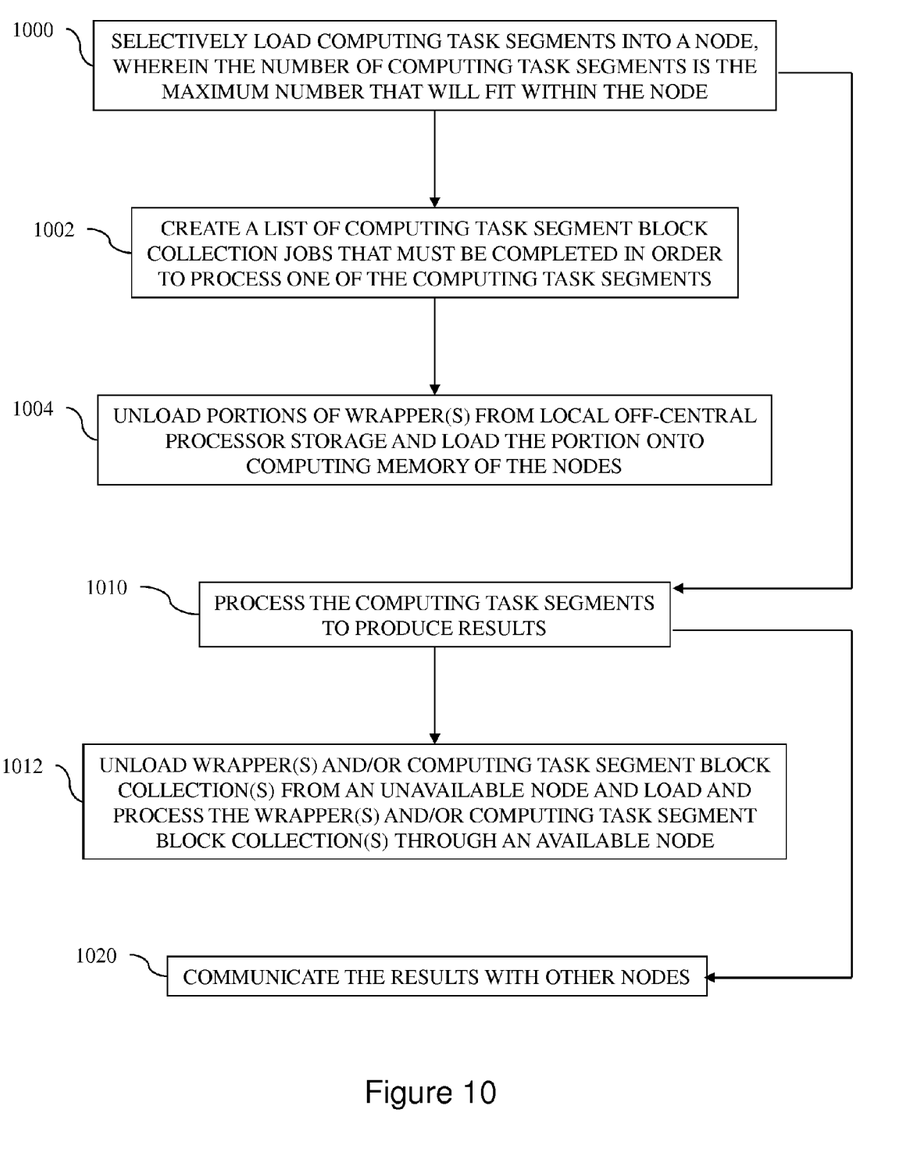
FIG. 10 illustrates a flow diagram of a method of the invention.

FIG. 10 illustrates a flow diagram of a virtual memory technique for efficiently solving connected problems in a distributed environment. In item 1000, the method begins by selectively loading computing task segments into a computing node, wherein the number of computing task segments is the maximum number of computing task segments that will fit within the computing node. Again, as discussed above, the computing task segments "know" about dependencies with other computing task segments or other threads (running or otherwise).

In item 1002, a list of computing task segment block collection jobs are created that must be completed in order to process one of the computing task segments. As discussed above, the computing task segment block collections are a subset of the computing task segments. The method further comprises, in item 1004, unloading portions of wrapper(s) from local off-central-processor storage and loading the portions of the wrapper(s) onto computing memory of the computing nodes. As also discussed above, the wrapper(s) are streamed into the computing node at disk transfer rate speeds.

Following this, in item 1010, the computing task segments are processed to produce computing task segment iteration results. The method further comprises, in item 1012, unloading wrapper(s) and/or computing task segment block collection(s) from an unavailable (e.g., overly burdened) computing node and loading and processing the wrapper(s) and/or computing task segment block collection(s) through an available computing node. In item 1020, the computing task segment iteration results are communicated with other computing nodes. Thus, as discussed above, embodiments herein have the ability to take a general-purpose parallel problem, described in the OptimalGrid object model, and then apply these virtual memory techniques through the exploitation of the internal OPC, OPC Collection and VPP structures that OptimalGrid uses.

Figure 11:
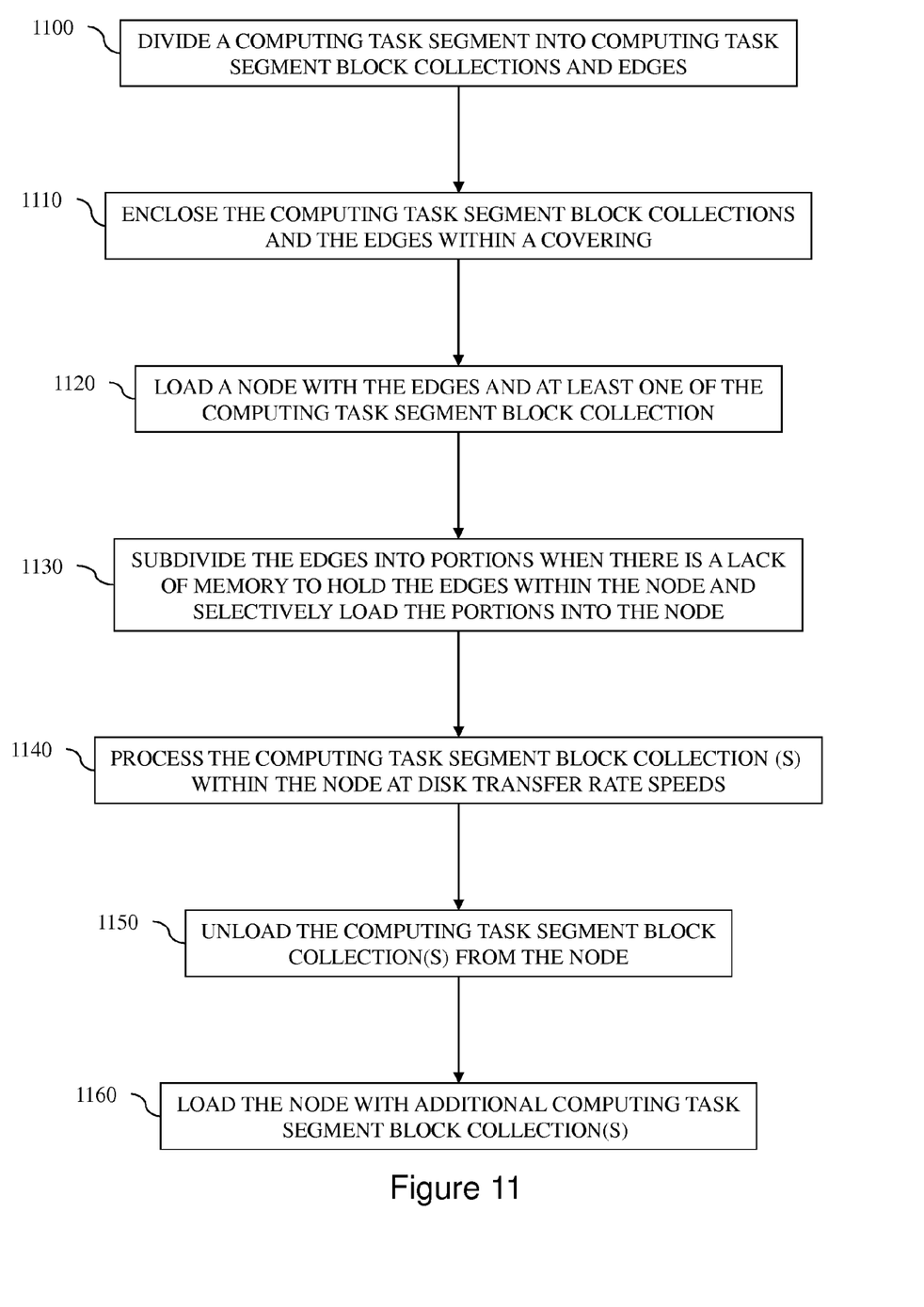
FIG. 11 illustrates a flow diagram of another method of the invention

FIG. 11 illustrates a flow diagram of another method for handling a computing task when a computing task segment is too large for a single computing node. In item 1100, the method begins by dividing a computing task segment into computing task segment block collections and computing task segment block edges. Next, in item 1110, the computing task segment block collections and the computing task segment block edges are enclosed within a covering. For example, as illustrated in FIGS. 8-9, either a multi-layer edge 800 can be used to surround OPC Collections 810; or, some number of OPC Collections 900 can be wrapped with a full layer of OPC Collections 910.

Following this, in item 1120, the computing task segment block edges and at least one of the computing task segment block collections are loaded onto a computing node. Again, as illustrated in FIG. 7, a sparse VPP 700 is shown, with all edges 710 present, but only one OPC Collection 720 at a time is brought in for processing. When there is a lack of memory to hold the computing task segment block edges within the computing node, the method, in item 1130, subdivides the computing task segment block edges into portions and selectively loads the portions into the computing node.

The computing task segment block collection(s) are subsequently processed within the computing node, in item 1140, wherein the computing task segment block collection(s) 10 are processed at disk transfer rate speeds. Next, in item 1150, the computing task segment block collection(s) are unloaded from the computing node; and, in item 1160, the computing node is loaded with additional computing task segment block collection(s).

Accordingly, embodiments herein relate to managing VPPs (i.e., the computing task segments), which are collections of OPCs (i.e., the computing task segment block collections)—essentially the unit cells of a distributed computing job. OPCs on the edges of a VPP serve as intercommunication nodes to buffer data being sent back/forth to/from other VPPs. Entire edges can be swapped between VPPs to transfer information needed by different VPPs. The set of edges is referred to as an OCW (i.e., the wrapper or covering). The problem is that a particular computing node has only so much local memory, so it can process only a certain number of VPPs at a time, perhaps even not an entire VPP at once, without using a lot of local off-cpu storage (which is slow). The solution is to load as many VPPs as possible into local memory for fast processing, with priority given to OCWs that can be streamed in and processed first so the results of a VPP iteration are available for communication with other nodes. If one computing node is free, it can load and process OCWs for another computing node to speed up overall processing.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A computer-implemented method for adapting available central processor computing memory to local off-central-processor storage in a distributed computing environment, comprising:

selectively loading, by a computing device, said computing memory with at least one of a plurality of variable program partitions according to a number of said variable program partitions that will fit into said computing memory, wherein said variable program partitions comprise original problem cell collection wrappers; and selectively loading, by said computing device, portions of said original problem cell collection wrappers from said local off-central-processor storage into said computing memory, wherein said variable program partitions represent a subset of an overall computing task, and wherein said original problem cell wrappers are adapted to enclose said variable program partitions to buffer and communicate data between variable program partitions adjacent to said at least one of said plurality of variable program partitions; and wherein said original problem cell collection wrappers are streamed into said computing memory based on a list of original problem cell collection wrapper jobs that must be computed to finish computations for said at least one of said plurality of said variable program partitions.

2. The method according to claim 1, wherein said original problem cell collection wrappers are streamed into said computing memory at a maximum rate that a disk can read and write data.

3. The method according to claim 1, wherein said original problem cell collection wrappers may be streamed into any of a plurality of computing nodes for relatively higher priority processing.

4. A computer-implemented method, comprising:

selectively loading, by a computing device, a number of computing task segments into a first node of a plurality of computing nodes, wherein said number of said computing task segments comprises a maximum number of said computing task segments that will fit within said first node, wherein said computing task segments are enclosed within wrappers that buffer and communicate data between computing nodes adjacent to said first node of said plurality of computing nodes, wherein said wrappers comprise priority wrappers that must be computed in order to process said computing task segments, and wherein said priority wrappers are loaded into said first node first during said selectively loading of said number of said computing task segments;

processing, by said computing device, said number of said computing task segments from said first node to produce computing task segment iteration results; and communicating, by said computing device, said computing task segment iteration results with said plurality of computing nodes; and wherein said computing task segments comprise computing task segment block collections, and creating, by said computing device, a list of computing task segment block collection jobs that must be completed in order to process one of said computing task segments.

5. The method according to claim 4, further comprising:

unloading, by said computing device, at least one of said wrappers from an unavailable computing node of said plurality of computing nodes; and loading and processing, by said computing device, said at least one of said wrappers through an available computing node of said plurality of computing nodes.

6. The method according to claim 4, wherein said selectively loading said number of said computing task segments comprises streaming said wrappers into said first node at a maximum rate that a disk can read and write data.

7. The method according to claim 4, further comprising:

unloading, by said computing device, portions of said wrappers from said local off-central-processor storage; and loading, by said computing device, said portions of said wrappers onto computing memory of said computing nodes.

8. A computer-implemented method for handling a computing task when a computing task segment is too large for a single computing node, comprising:

dividing, by a computing device, said computing task segment into a plurality of computing task segment block collections and computing task segment block edges;

loading, by said computing device, said computing node with said computing task segment block edges and at least one of said computing task segment block collections, said computing task segment block edges buffer and communicate data between other computing nodes adjacent to said computing node;

processing, by said computing device, said at least one of said computing task segment block collections within said computing node;

unloading, by said computing device, said at least one of said computing task segment block collections from said computing node; and loading, by said computing device, said computing node with an additional computing task segment block collection from said plurality of computing task segment collections; and selectively and preferentially loading, by said computing device, said computing node with at least one of said computing task segment block edge portions.

9. The method according to claim 8, further comprising subdividing, by said computing device, said computing task segment block edges into a plurality of computing task segment block edge portions when there is a lack of computing memory to hold said computing task segment block edges within said computing node.

10. The method according to claim 8, wherein said computing task segment block collections are processed at a maximum rate that a disk can read and write data.

11. A computer-implemented method for handling a computing task when a computing task segment is too large for a single computing node, comprising:

dividing, by a computing device, said computing task segment into a plurality of computing task segment block collections and computing task segment block edges;

enclosing, by a computing device, said plurality of said computing task segment block collections and said computing task segment block edges within a covering that buffers and communicates data between other computing nodes adjacent to said single computing node;

loading, by a computing device, said computing node with said covering, said computing task segment block edges, and at least one of said computing task segment block collections;

processing, by a computing device, said at least one of said computing task segment block collections within said computing node;

unloading, by a computing device, said at least one of said computing task segment block collections from said computing node; and loading, by a computing device, said computing node with an additional computing task segment block collection from said plurality of computing task segment collections; and selectively loading, by a computing device, said computing node with at least one of said computing task segment block edge portions.

12. The method according to claim 11, further comprising subdividing, by a computing device, said computing task segment block edges into a plurality of computing task segment block edge portions when there is a lack of computing memory to hold said computing task segment block edges within said computing node.

13. The method according to claim 11, wherein said computing task segment block collections are processed at a maximum rate that a disk can read and write data.

14. The method according to claim 11, wherein said covering comprises multiple layers of computing task segment blocks.

15. The method according to claim 11, wherein said covering comprises a wrapper of computing task segment block collections.

* * * * *